United States Patent
Tsai et al.

(10) Patent No.: US 10,613,694 B2
(45) Date of Patent: Apr. 7, 2020

(54) TOUCH PANEL, TOUCH DISPLAY PANEL USING SAME, AND METHOD FOR MAKING SAME

(71) Applicants: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhunan (TW)

(72) Inventors: Han-Lung Tsai, Hsinchu (TW); Chih-Peng Chang, Hsinchu (TW); Ping-Yang Chen, Hsinchu (TW)

(73) Assignees: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTIONS LIMITED, Zhunan (TW)

(*) Notice: Subject to any disclaimer, the term of this patent is extended or adjusted under 35 U.S.C. 154(b) by 0 days.

(21) Appl. No.: 16/021,330

(22) Filed: Jun. 28, 2018

(65) Prior Publication Data
US 2019/0235658 A1    Aug. 1, 2019

(30) Foreign Application Priority Data
Feb. 1, 2018    (CN) .......................... 2018 1 0102081

(51) Int. Cl.
G06F 3/041    (2006.01)
G06F 3/044    (2006.01)
G06F 3/047    (2006.01)

(52) U.S. Cl.
CPC ............ G06F 3/044 (2013.01); G06F 3/0443 (2019.05); G06F 3/0446 (2019.05);
(Continued)

(58) Field of Classification Search
CPC . G06F 1/16; G06F 1/169; G06F 3/041; G06F 3/0412; G06F 3/044; G06F 3/0443;
(Continued)

(56) References Cited

U.S. PATENT DOCUMENTS 9,356,087 B1* 5/2016 Lee .................. H01L 27/3276
2009/0160817 A1* 6/2009 Wu ..................... G06F 3/044
345/173
(Continued)

Primary Examiner — Michael J Eurice
(74) Attorney, Agent, or Firm — ScienBiziP, P.C.

(57) ABSTRACT

A touch panel defines a touch area and a reduced border area surrounding the touch area. The touch panel includes a substrate, a first conductive layer on the substrate, an insulating layer on the substrate and covering the first conductive layer, and a second conductive layer on the insulating layer. The second conductive layer includes first electrodes and strings of second electrodes in the touch area, each string of second electrodes extending in a first direction. The first conductive layer is conductive but almost opaque. The first conductive layer includes a decorative portion in the border area and first bridge portions in the touch area. Each first bridge portion is electrically coupled between adjacent two first electrodes in a second direction that intersects with the first direction. The decorative portion is configured to release static electricity and shield the border area.

16 Claims, 6 Drawing Sheets

(52) U.S. Cl.
CPC ............... *G06F 3/04164* (2019.05); *G06F 2203/04103* (2013.01); *G06F 2203/04107* (2013.01); *G06F 2203/04111* (2013.01)

(58) Field of Classification Search
CPC .......... G06F 3/047; G06F 2203/04103; G06F 2203/04107; G06F 2203/04111; H01L 27/3279; H01L 51/0097
See application file for complete search history.

(56) References Cited

U.S. PATENT DOCUMENTS

| | | | |
|---|---|---|---|
| 2013/0057497 A1* | 3/2013 | Cho ................. | G06F 3/044 345/173 |
| 2014/0070350 A1* | 3/2014 | Kim ................. | G06F 3/0412 257/432 |
| 2015/0198832 A1* | 7/2015 | Yang ................ | G02F 1/13338 349/12 |
| 2016/0041644 A1* | 2/2016 | Bae ................. | G06F 3/044 345/174 |
| 2016/0041647 A1* | 2/2016 | Bae ................. | G06F 3/044 345/174 |
| 2017/0235390 A1* | 8/2017 | Dong ................ | G06F 3/044 345/173 |
| 2017/0373270 A1* | 12/2017 | Kim ................. | H01L 27/323 |
| 2018/0061814 A1* | 3/2018 | Lee ................. | H01L 25/0753 |
| 2018/0164933 A1* | 6/2018 | Jun ................. | G06F 3/044 |
| 2018/0307346 A1* | 10/2018 | Lee ................. | G06F 3/044 |
| 2018/0348905 A1* | 12/2018 | Ishihara ............ | G03F 7/038 |
| 2019/0018540 A1* | 1/2019 | Ko ................. | G06F 3/0418 |
| 2019/0073052 A1* | 3/2019 | Chen ................ | G06F 3/0416 |
| 2019/0129545 A1* | 5/2019 | Chen ................ | G06F 3/0412 |

* cited by examiner

TOUCH PANEL, TOUCH DISPLAY PANEL USING SAME, AND METHOD FOR MAKING SAME

FIELD

The subject matter herein generally relates to a touch panel, a touch display panel using the touch panel, and a method for making the touch panel.

BACKGROUND

A touch display device generally includes a touch area and a border area surrounding the touch area. A plurality of conductive lines is provided in the border area, and an ink layer is provided in the border area to shield the conductive lines. However, the ink layer is usually made of organic materials that have poor antistatic properties. Therefore, there is room for improvement in the art.

BRIEF DESCRIPTION OF THE DRAWINGS

Implementations of the present technology will now be described, by way of example only, with reference to the attached figures.

DETAILED DESCRIPTION

Figure 1:
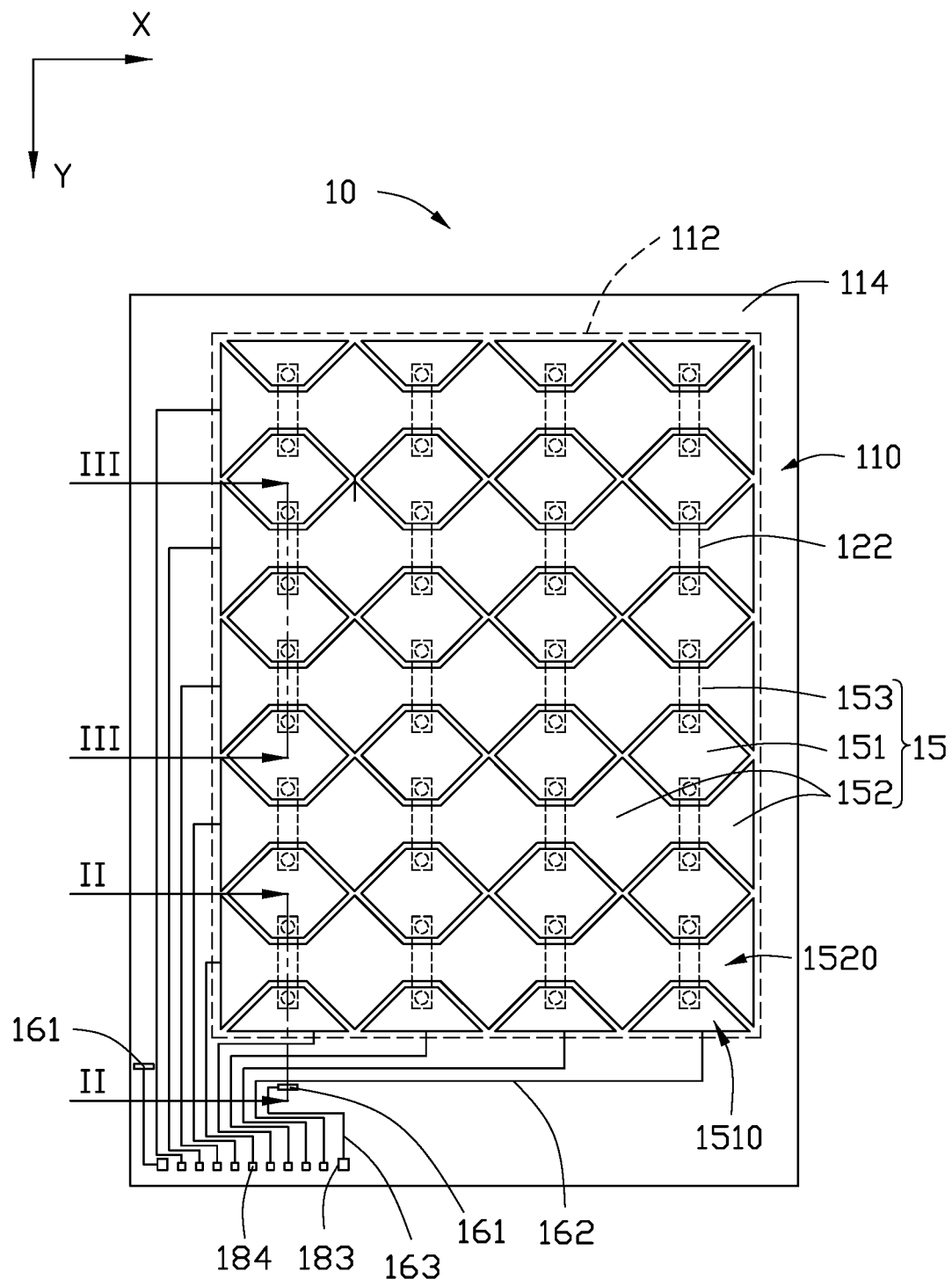
FIG. 1 is a plan view of a touch panel according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising" when utilized, means "including, but not necessarily limited to"; it specifically indicates open-ended inclusion or membership in the so-described combination, group, series, and the like.

First Embodiment

Figure 2:
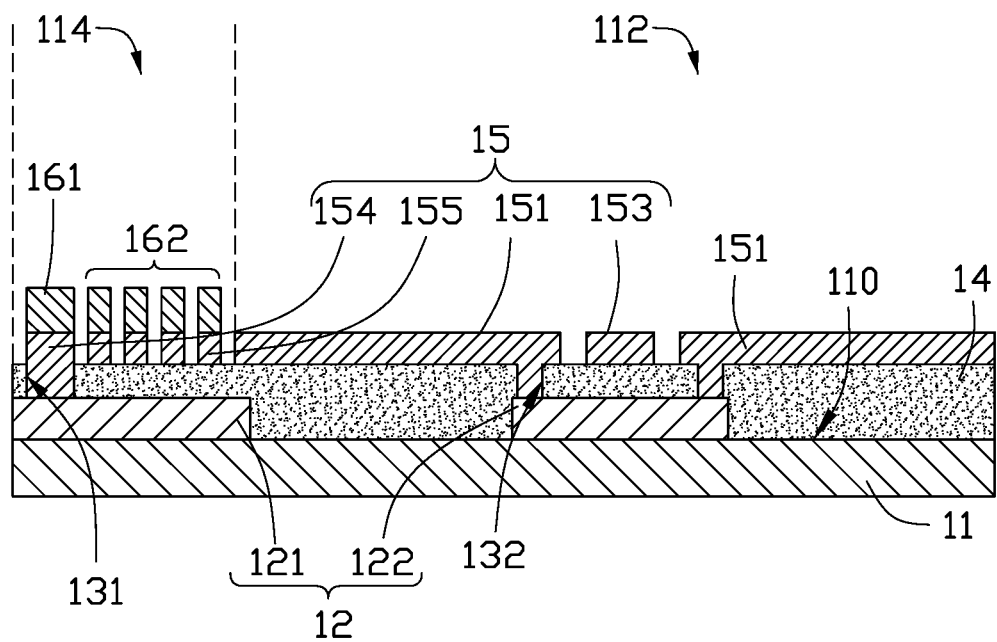
FIG. 2 is a cross-sectional view of the touch panel of FIG. 1 taken along line II-II.
Figure 3:
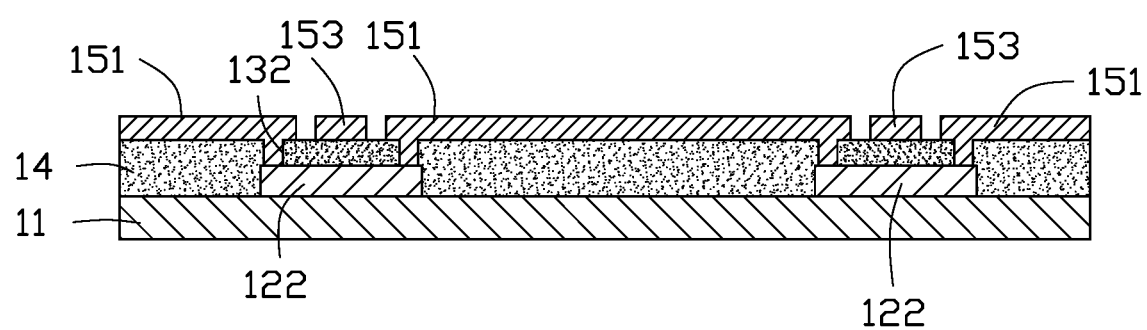
FIG. 3 is a cross-sectional view of the touch panel of FIG. 1 taken along line III-III.

FIG. 1 through FIG. 3 illustrate a touch panel 10 according to an embodiment of the present disclosure. As shown in FIG. 2, the touch panel 10 includes a substrate 11, a first conductive layer 12 on the substrate 11, a insulating layer 14 on the substrate 11 and covering the first conductive layer 12, and a second conductive layer 15 on the insulating layer 14. As shown in FIG. 1, the touch panel 10 defines a touch area 112 and a border area 114 surrounding the touch area 112. In this embodiment, the touch area 112 is substantially rectangular. In other embodiments, the touch area 112 is not limited to being rectangular and can be other shapes, such as round, oval, or the like.

As shown in FIG. 2, the substrate 11 is configured to carry the first conductive layer 12, the insulating layer 14, and the second conductive layer 15. The substrate 11 may be made of a flexible material or a non-flexible material. In this embodiment, the substrate 11 is made of a flexible material, so that the touch panel 10 can be applied to a flexible display device. The substrate 11 may be made of an organic material, such as polycarbonate (PC), polyimide (PI), polyethylene naphthalate (PEN), polyethylene glycol terephthalate (PET), and cyclo-olefin polymer (COP). The substrate 11 may also be made of an inorganic material, such as silicon dioxide ($SiO_2$). It can be understood that the material of the substrate 11 can be selected according to actual needs.

The first conductive layer 12 is made of an electrically-conductive material that is almost totally opaque. The first conductive layer 12 includes a decorative portion 121 and a plurality of first bridge portions 122 arranged in a same layer. The decorative portion 121 and the first bridge portions 122 may be formed by patterning the first conductive layer 12. In this embodiment, the absorbance (OD) of light of the first conductive layer 12 is equal to or greater than 3. Thus, the decorative portion 121 is capable of shielding and covering the border area 114 (shielding other elements below in the border area 114 from view) and has a good antistatic property. The first bridge portions 122 are located in the touch area 112 and are arranged in a matrix. The decorative portion 121 is located in the border area 114 and is spaced apart from the first bridge portions 122.

The first conductive layer 12 may be made of a metal material, a conductive non-metallic material, or a composite conductive material including a non-conductive material doped with a conductive material. The first conductive layer 12 may be may be formed on a first surface 110 of the substrate 11 by physical vapor deposition (PVD) or chemical vapor deposition (CVD). The thickness of the first conductive layer 12 is about 1000-3000 angstroms (Å). In other embodiments, the first conductive layer 12 may be made of an organic material doped with a conductive material, such as a phenolic resin doped with metal particles.

As shown in FIG. 2 and FIG. 3, the insulating layer 14 is formed on the surface 110 of the substrate 11 and covers the first conductive layer 12. The insulating layer 14 may be made of a transparent and insulating material.

As shown in FIG. 2, the insulating layer 14 defines at least one first through hole 131 and a plurality of second through holes 132. The first through hole 131 corresponds to the decorative portion 121, the decorative portion 121 is exposed from the insulating layer 14 by the first through hole 131. Electrical contact can be achieved between the decorative portion 121 and other elements of the touch panel 10 by the first conductive through hole 131. Thus, when the decorative portion 121 is used as an antistatic element, the internal electrostatic charge in the touch panel 10 can be released. In this embodiment, the number of first through holes 131 is two. In other embodiments, the number may be one or more than two. The second through holes 132 correspond to the first bridge portions 122 and each first bridge portion 122 is exposed from the insulating layer 14 by two second through holes 132.

As shown in FIG. 2, the second conductive layer 15 is located on a side of the insulating layer 14 away from the first conductive layer 12. The second conductive layer 15 includes a plurality of first electrodes 151, a plurality of second electrodes 152, a plurality of second bridge portions 153, at least one connecting portion 154, and a plurality of connecting lines 155. The first electrodes 151, the second electrodes 152, the second bridge portions 153, the connecting portion 154, and the connecting lines 155 are formed by patterning the second conductive layer 15. The second conductive layer 15 is made of a transparent electrically conductive material, such as indium tin oxide (ITO).

As shown in FIG. 1, the first electrodes 151, the second electrodes 152, and the second bridge portions 153 are located in the touch area 112. As shown in FIG. 1, the first electrodes 151 are spaced apart from each other and arranged in a matrix. Each first electrode 151 is spaced apart and insulated from each second electrode 152. The first electrodes 151 are arranged in a matrix having a plurality of rows each in a first direction (X direction shown in FIG. 1) and a plurality of columns each in a second direction (Y direction shown in FIG. 1). The first direction intersects with the second direction. In the present embodiment, the first direction is perpendicular to the second direction. As shown in FIG. 1, every two adjacent first electrodes 151 in a same column are electrically coupled by one first bridge portion 122. Each first bridge portion 122 is coupled between adjacent first electrodes 151 in the same column and is substantially located between the two adjacent second first electrodes 151. The first electrodes 151 and the first bridge portions 122 in the same column cooperate to form a string (first string 1510) of first electrodes 152. The first electrodes 151 in different columns are insulated from each other. As shown in FIG. 2 and FIG. 3, each first electrode 151 extends into the second through hole 132 to electrically couple to the first bridge portion 122. For each first bridge portion 122, there are two second through holes 132 for exposing the first bridge portion 122.

As shown in FIG. 1, the second electrodes 152 are arranged in a plurality of rows in the first direction (X direction shown in FIG. 1). Every two adjacent second electrodes 152 in a same row are electrically coupled by one second bridge portion 153. Each second bridge portion 153 is coupled between two adjacent second electrodes 152 in one row and is substantially located between the two adjacent second electrodes 152. The second electrodes 152 and the second bridge portions 153 in a same row cooperate to form a string (second string 1520) of second electrodes 152. The second electrodes 152 in different rows are insulated from each other. The second strings 1520 and the first strings 1510 cooperate to form a mutual capacitance touch sensing structure. When the first electrodes 151 function as touching driving electrodes, the second electrodes 152 function as touch sensing electrodes. When the first electrodes 151 function as touching sensing electrodes, the second electrodes 152 function as touch driving electrodes.

As shown in FIG. 2, the second bridge portions 153 and the first bridge portions 122 are located on opposite sides of the insulating layer 14. Each second bridge portion 153 corresponds to one first bridge portion 122. A projection of each second bridge portion 153 on the substrate 11 overlaps with a projection of one first bridge portion 122.

The at least one connecting portion 154 and the connecting lines 155 are located in the border area 114. Each connecting portion 154 extends into one first through hole 131 to electrically couple to the decorative portion 121. The connecting lines 155 are electrically insulated from each other. Each connecting line 155 may be electrically coupled to one first string 1510 or to one second string 1520.

As shown in FIG. 1, the touch panel 10 further includes at least one connecting pad 161, a plurality of first conductive lines 162, and at least one second conductive line 163. The at least one connecting pad 161, the first conductive lines 162, and the at least one second conductive line 163 are located in the border area 114 and can be formed by patterning a single conductive layer D (shown in FIG. 4E). As shown in FIG. 1, in the present embodiment, there are two connecting pads 161. As shown in FIG. 2, each connecting pad 161 is formed on one connecting portion 154 and the pad 161 is in direct contact with the connecting portion 154 to electrically couple to the connecting portion 154. As shown in FIG. 2, each first conductive line 162 is formed on one connecting line 155 and is in direct contact with the connecting line 15 to electrically couple to the connecting line 15. Each connecting pad 161 is electrically coupled to one second conductive line 163. The first conductive lines 162 and the at least one second conductive line 163 are electrically coupled to an external circuit (not shown).

The decorative portion 121 in the border area 114 has a poor light-transmission qualities (is almost opaque), thus the decorative portion 121 can shield or hide the elements (such as the connecting lines 155, the first conductive lines 162, the connecting portion 154, and the connecting pad 161) in the border area 114. Additionally, the decorative portion 121 in the border area 114 is conductive; the decorative portion 121 can be used as an anti-static element of the touch panel 10 and can effectively protect the touch panel 10 from static electricity by transmitting the static electricity to the external circuit (not shown) or be grounded by the connecting portion 154, the connecting pad 161, and the second conductive line 163. Since additional electrostatic protection is not required in the border area 114, the border area 114 can be further narrowed. Further, the decorative portion 121 can be formed by PVD or CVD, a thickness of the decorative portion 121 may be in a range of 1000-3000 angstroms (Å). Compared to a traditional decorative layer that is made of ink, photoresist, or black matrix and that has a thickness of 2 μm to 10 μm, the decorative portion 121 of this disclosure has a reduced thickness and can reduce the frailty and risk of breaking the first conductive lines 162.

Figure 5:
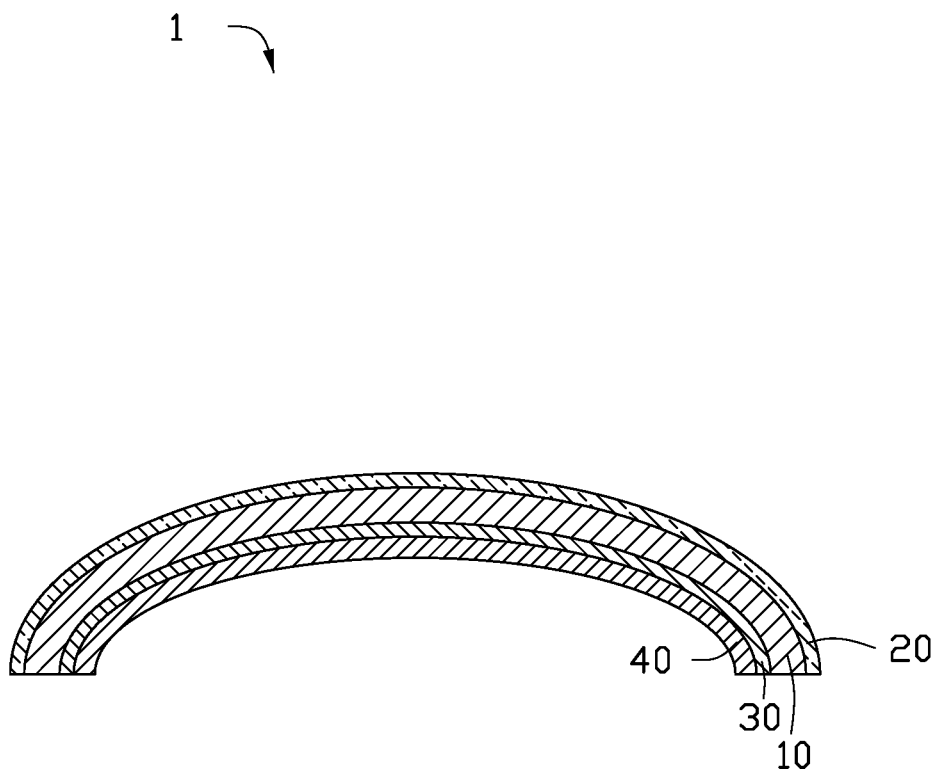
FIG. 5 is a cross-sectional view of a touch display panel according to an embodiment of the present disclosure.

FIG. 5 illustrates a touch display panel 1 having the touch panel 10 of the present embodiment. The touch display panel 1 includes a cover 20, the touch panel 10, a polarizer 30, and a display panel 40. The touch panel 10 is attached to a surface of the cover 20, and the polarizer 30 is attached to a side of the touch panel 10 away from the cover 20. The display panel 40 is attached to a side of the polarizer 30 away from the touch panel 10.

In this embodiment, the cover 20 is flexible and curved. Correspondingly, the substrate 11 of the touch panel 10 is made of a flexible material, and the display panel 40 is an OLED display panel. In other embodiments, the cover 20 may be a flat plate, and the substrate 11 of the touch panel 10 may be made of a non-flexible material, and the display panel 40 may be an LCD display panel.

FIG. 4A through FIG. 4G illustrate a method for making the above-described touch panel. The method may include one or more of the following steps.

Figure 4A:
FIG. 4A through FIG. 4G are cross-sectional views illustrating a method for making the touch panel.
Figure 4A:
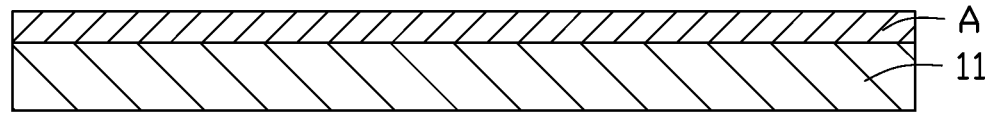

Step S1: as shown in FIG. 4A, a substrate 11 is provided and a first conductive layer A is formed on a surface of the substrate 11.

The first conductive layer A is almost opaque. The first conductive layer A may be formed on the substrate 11 by PVD or CVD.

Figure 4B:
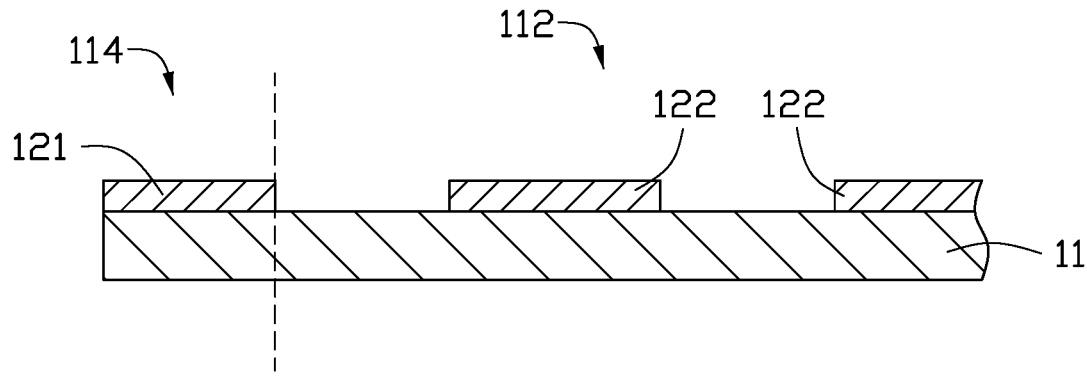

Step S2: as shown in FIG. 4B, the first conductive layer A is patterned to form a decorative portion 121 and a plurality of first bridge portions 122 which is spaced apart from the decorative portion 121.

As shown in FIG. 4B, the substrate 11 defines a touch area 112 and a border area 114 surrounding the touch area 112. The first bridge portions 122 are located in the touch area 112 and are arranged in a matrix. The decorative portion 121 is located in the border area 114.

Figure 4C:
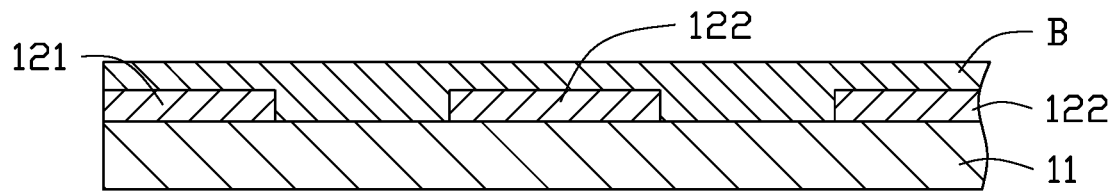

Step S3: as shown in FIG. 4C, an insulating layer B is formed on the substrate 11 to cover the decorative portion 121 and the first bridge portions 122.

Figure 4D:
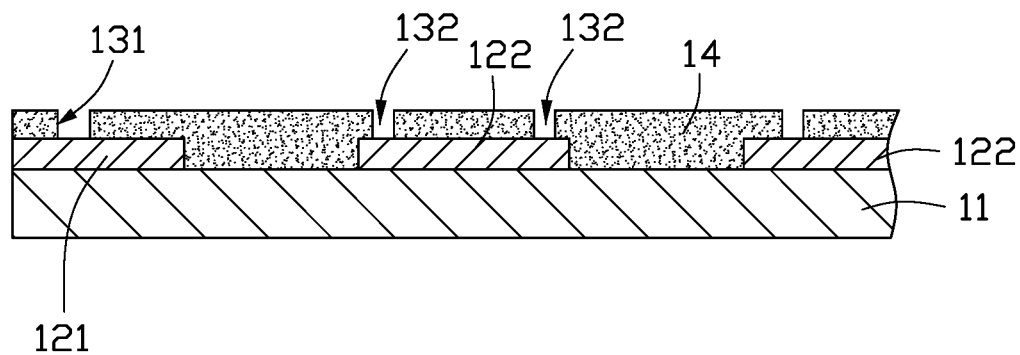

Step S4: as shown in FIG. 4D, the insulating layer B is etched to form an insulating layer 14 defining a first through hole 131 and a plurality of second through holes 132.

As shown in FIG. 4D, the first through hole 131 corresponds to the decorative portion 121; and the decorative portion 121 is exposed from the insulating layer 14 by the first through hole 131. The second through holes 132 correspond to the first bridge portions 122 and each first bridge portion 122 is exposed from the insulating layer 14 by two second through holes 132.

Figure 4E:
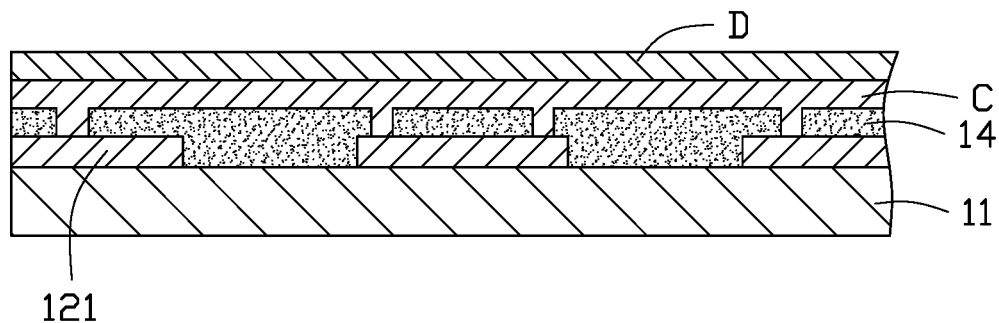

Step S5: as shown in FIG. 4E, a second conductive layer C is formed on the insulating layer 14 and a third conductive layer D is formed on the second conductive layer C.

The second conductive layer C extends into the first through hole 131 and the second through holes 132. The third conductive layer D is formed on a side of the second conductive layer C away from the substrate 11.

Figure 4F:
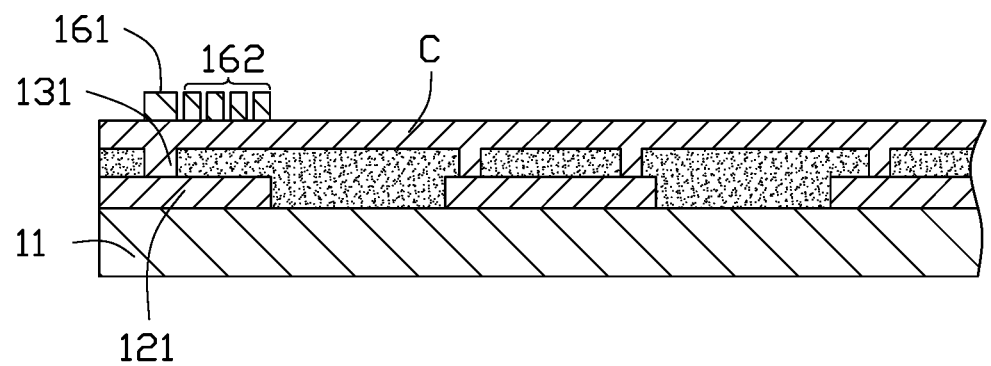
Figure 4G:
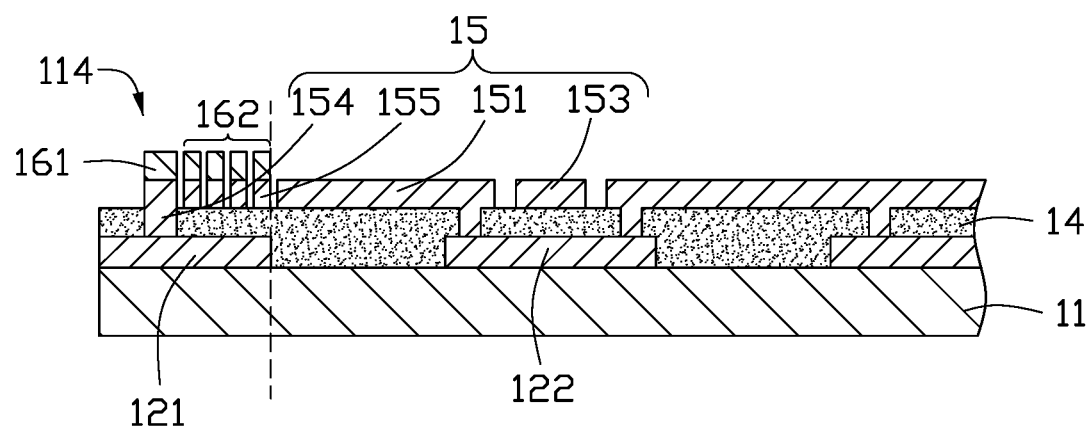

Step S6: as shown in FIG. 4F, the third conductive layer D is patterned to form at least one connecting pad 161, a plurality of first conductive lines 162, and a second conductive line (not shown).

The at least one connecting pad 161, the first conductive lines 162, and the at least one second conductive line are located in the border area 114. The first conductive lines 162 are spaced apart from each other. The connecting pad 161 is spaced apart from the first conductive lines 162. The second conductive line is electrically coupled to the connecting pad 161.

Step S7: as shown in FIG. 4F, the second conductive layer C is patterned to form the above-described second conductive layer 15.

As shown in FIG. 4F, the second conductive layer 15 includes a plurality of first electrodes 151, a plurality of second electrodes 152 (not shown in FIG. 4F but shown in FIG. 1), a plurality of second bridge portions 153, at least one connecting portion 154, and a plurality of connecting lines 155. The first electrodes 151, the second electrodes 152, and the second bridge portions 153 are located in the touch area 112. The connecting portion 154 and the connecting lines 155 are located in the border area 114. Each first electrode 151 extends into at least one second through hole 132 to electrically couple to at least one first bridge portion 122. The first electrodes 151 and the first bridge portions 122 in one column cooperate to form a first string of the first electrodes 152. Each connecting portion 154 extends into the first through hole 131 to electrically couple to the decorative portion 121. Each connecting line 155 is electrically coupled to one first electrode 151 or to one second electrode 152.

It is to be understood, even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A touch panel defining a touch area and a border area surrounding the touch area, the touch panel comprising:
   a substrate;
   a first conductive layer on the substrate;
   an insulating layer on the substrate and covering the first conductive layer; and
   a second conductive layer on the insulating layer, the second conductive layer comprising a plurality of first electrodes spaced apart from each other in the touch area and a plurality of strings of second electrodes spaced apart from the plurality of first electrodes in the touch area, each of the plurality of strings of second electrodes extending in a first direction, the plurality of first electrodes and the plurality of strings of second electrodes being on a side of the insulating layer away from the substrate;
   wherein the first conductive layer is made of an electrically conductive opaque material; the first conductive layer comprises a decorative portion in the border area and a plurality of first bridge portions in the touch area; each of the plurality of first bridge portions is electrically coupled between adjacent two of the plurality of first electrodes in a second direction that intersects with the first direction; the decorative portion is an antistatic element of the touch panel to transmit static electricity.

2. The touch panel of claim 1, wherein the decorative portion is configured to release static electricity and shield the border area.

3. The touch panel of claim 1, wherein the plurality of first electrodes are arranged in a matrix having a plurality of columns each extending in the second direction; each of the plurality of columns of first electrodes are electrically coupled together by the first bridge portions to form a string of first electrodes.

4. The touch panel of claim 3, wherein each of the plurality of first electrodes extends though the insulating layer to electrically couple to at least one of the plurality of first bridge portions.

5. The touch panel of claim 3, wherein the second conductive layer further comprises a connecting portion in the border area and a plurality of connecting lines in the border area; the connecting portion extends though the insulating layer to electrically couple to the decorative portion; each of the plurality of connecting lines is electrically coupled to one of the plurality of strings of second electrodes or one string of second electrodes.

6. The touch panel of claim 5, further comprising a connecting pad, a plurality of first conductive line, and a second conductive line in the border area; wherein the connecting pad is formed on the connecting portion and is in direct contact with the connecting portion to electrically couple to the connecting portion; each of the plurality of first conductive lines is formed on one of the plurality of connecting lines and is in direct contact with the one connecting line to electrically couple to the one connecting line; the connecting pad is electrically coupled to the second conductive line.

7. A touch display panel, comprising:
   A touch panel;

the touch panel defining a touch area and a border area surrounding the touch area, the touch panel comprising:
a substrate;
a first conductive layer on the substrate;
an insulating layer on the substrate and covering the first conductive layer; and
a second conductive layer on the insulating layer, the second conductive layer comprising a plurality of first electrodes spaced apart from each other in the touch area and a plurality of strings of second electrodes spaced apart from the plurality of first electrodes in the touch area, each of the plurality of strings of second electrodes extending in a first direction, the plurality of first electrodes and the plurality of strings of second electrodes being on a side of the insulating layer away from the substrate;
wherein the first conductive layer is made of an electrically conductive opaque material; the first conductive layer comprises a decorative portion in the border area and a plurality of first bridge portions in the touch area; each of the plurality of first bridge portions is electrically coupled between adjacent two of the plurality of first electrodes in a second direction that intersects with the first direction; the decorative portion is an antistatic element of the touch panel to transmit static electricity.

8. The touch display panel of claim 7, wherein the decorative portion is configured to release static electricity and shield the border area.

9. The touch display panel of claim 7, wherein the plurality of first electrodes are arranged in a matrix having a plurality of columns each extending in the second direction; each of the plurality of columns of first electrodes are electrically coupled together by the first bridge portions to form a string of first electrodes.

10. The touch display panel of claim 9, wherein each of the plurality of first electrodes extends though the insulating layer to electrically couple to at least one of the plurality of first bridge portions.

11. The touch display panel of claim 9, wherein the second conductive layer further comprises a connecting portion in the border area and a plurality of connecting lines in the border area; the connecting portion extends though the insulating layer to electrically couple to the decorative portion; each of the plurality of connecting lines is electrically coupled to one of the plurality of strings of second electrodes or one string of second electrodes.

12. The touch display panel of claim 11, further comprising a connecting pad, a plurality of first conductive line, and a second conductive line in the border area; wherein the connecting pad is formed on the connecting portion and is in direct contact with the connecting portion to electrically couple to the connecting portion; each of the plurality of first conductive lines is formed on one of the plurality of connecting lines and is in direct contact with the one connecting line to electrically couple to the one connecting line; the connecting pad is electrically coupled to the second conductive line.

13. A method for making a touch panel, comprising:
providing a substrate and forming a first conductive layer on a surface of the substrate, the first conductive layer being made of an electrically conductive opaque material, the substrate defining a touch area and a border area surrounding the touch area;
patterning the first conductive layer to form a plurality of first bridge portions in the touch area and a decorative portion in the border area;
forming an insulating layer on the substrate, the insulating layer covering the plurality of first bridge portions and the decorative portion;
defining a first through hole and a plurality of second through hole in the insulating layer, the decorative portion exposing from the insulating layer by the first through hole, each of the plurality of first bridge portions exposing from the insulating layer by two of the plurality of second through hole;
forming a second conductive layer on the insulating layer;
patterning the second conductive layer to form a plurality of first electrodes and a plurality of strings of second electrodes in the touch area; the plurality of first electrodes being spaced apart from each other and spaced apart from the plurality of strings of second electrodes; each of plurality of first electrodes extends into at least one of the plurality of second through hole to electrically couple to at least one of plurality of first bridge portions, the plurality of first electrodes and the plurality of strings of second electrodes being on a side of the insulating layer away from the substrate.

14. The touch display panel of claim 13, wherein the decorative portion is configured to release static electricity and shield the border area.

15. The touch display panel of claim 13, wherein each of the plurality of strings of second electrodes extends in a first direction; the plurality of first electrodes are arranged in a matrix having a plurality of columns each extending in a second direction that intersects with the first direction; each of the plurality of columns of first electrodes are electrically coupled together by the first bridge portions to form a string of first electrodes.

16. The touch display panel of claim 15, wherein patterning the second conductive layer also forms a connecting portion and a plurality of connecting lines in the border area; the connecting portion extends into first through hole to electrically couple to the decorative portion; each of the plurality of connecting lines is electrically couple to one string of first electrodes or one string of second electrodes.

* * * * *